March 2, 1926.  L. A. CARTER  1,575,252
FRICTION GEARING
Filed May 1, 1922
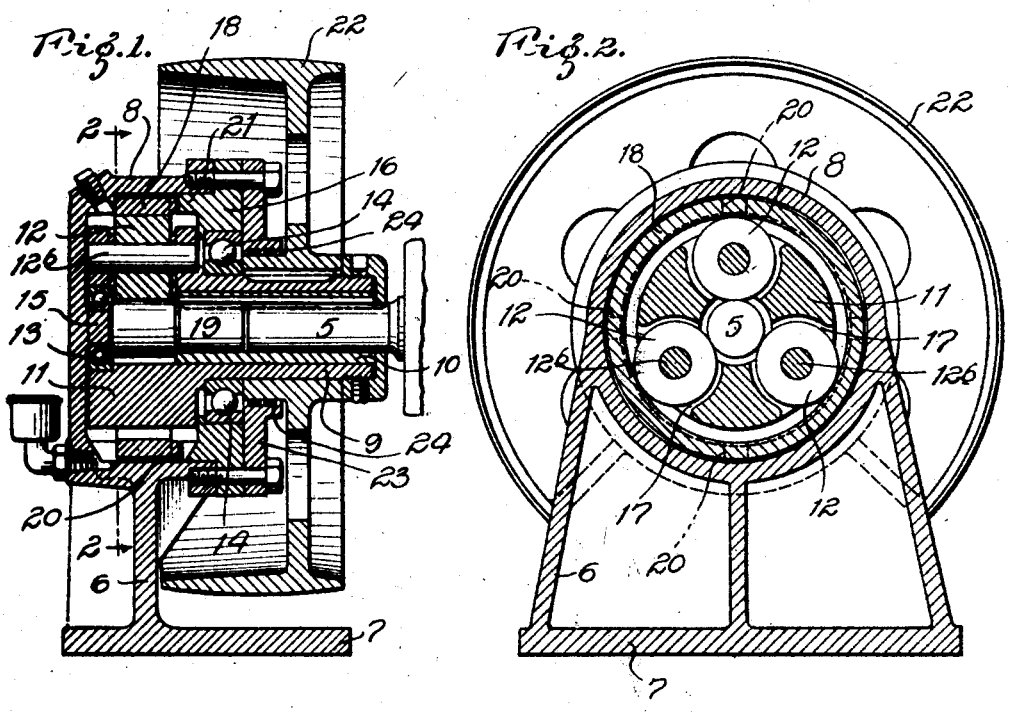
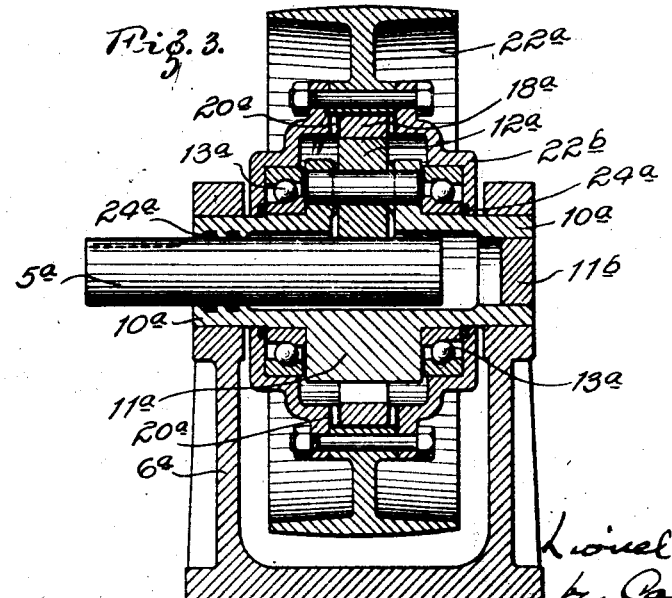
Inventor:
Lionel A. Carter,
by his Attorneys Patented Mar. 2, 1926.

1,575,252

UNITED STATES PATENT OFFICE.

LIONEL A. CARTER, OF ST. LOUIS, MISSOURI.

FRICTION GEARING.

Application filed May 1, 1922. Serial No. 557,555.

*To all whom it may concern:*

Be it known that I, LIONEL A. CARTER, a subject of Great Britain, and a resident of the city of St. Louis and State of Missouri, have invented a new and useful Improvement in Friction Gearing, of which the following is a specification.

This invention relates principally to planetary friction gearing and has for its principal object to create sufficient pressure between the contacting surfaces of the driving parts to overcome the tendency of said parts to slip, thereby adapting the gearing for transmitting heavy loads. The invention consists principally in the arrangement hereinafter described and shown for attaining the above object. It also consists in the process of assembling the friction gear; and it also consists in the combinations and arrangements of parts hereinafter described and claimed.

In the accompanying drawing, which forms part of this application and wherein like symbols refer to like parts wherever they occur, Fig. 1 is a central vertical longitudinal section through my friction gearing as applied to the drive shaft of an electric motor;

Fig. 2 is a vertical transverse section through said gearing on the line 2—2 in Fig. 1; and Fig. 3 is a section similar to Fig. 1 showing a modified form of gearing.

Referring to Figs. 1 and 2 of the accompanying drawing, my friction gearing is shown in connection with a driving member 5, such, for instance, as the driving shaft of an electric motor, and is adapted to transmit motion at a reduced speed from said driving member to a driven member 22.

Located adjacent to the projecting end of the drive shaft 5 is a bearing member or pedestal 6 having a base portion 7 adapted to be rigidly secured to a suitable support and an upper portion 8 in the form of a circular journal box or housing 8 concentric with said driving shaft.

A carrier member comprises a hollow shaft 9, which is journaled on a bushing 10 keyed to the drive shaft 5, and an enlarged head 11, which is located within the housing 8 of the pedestal 7 and is adapted to support planetary reduction wheels 12. The carrier member is rotatably supported on ball bearings 13 and 14, the bearing 13 for the head of the carrier being mounted on a centrally located boss 15 formed integral with the housing 8 and the bearing 14 for the shaft portion 9 of said carrier being mounted in a closure ring 16 bolted to the end of said housing. The enlarged head 11 of the carrier is provided with radially spaced slots 17 in which are journaled the friction wheels 12. These wheels are mounted on pins $12^b$ disposed parallel with the drive shaft 5 and supported in alined holes in the opposite walls of the slots 17.

Surrounding the friction wheels 12, with its inner circumferential face in contact with the peripheral surfaces of said wheels, is a hardened steel ring or circular track 18; and arranged between the opposing peripheral surfaces of said wheels and in contact therewith is a hardened steel shaft section 19, which extends into the sleeve 10 on the driving shaft 5 and is connected to said shaft by means of the key that secures said sleeve to said shaft. The ring 18 is preferably spaced away from the adjacent surface of the housing or casing 8 and is secured against rotation by means of circumferentially spaced lugs or tongues 20 that project from one end of the ring and are seated in correspondingly spaced notches or grooves in an annular flange 21 formed integral with the closure ring 16. With this arrangement, the friction between the contacting surfaces of the shaft extension 19, friction wheels 12 and stationary ring 18 serves to rotate the carrier at a reduced speed and in the same direction as the driving shaft 5.

The driven member 22 is shown in the form of a pulley, which is keyed on the hollow shaft 9 of the carrier so as to rotate therewith. An annular plate 23 is bolted to the outer face of the ring closure 16 and has annular grooves formed in its inner circumference adapted to form seats for packing 24, which bears against the hub of the pulley 22 and prevents the escape of oil through the rear bearing 14.

In the modified reduction gearing shown in Fig. 3, friction wheels $12^a$ are rotatably supported in a carrier $11^a$ having oppositely extending hub portions $10^a$ now rotatably supported in the spaced bearings of a pedestal $6^a$. A pulley $22^a$ has a two piece hub portion $22^b$ that encloses the friction wheels $12^a$ and is rotatably supported on the hub portions $10^a$ of the carrier $11^a$ by means of bearings $13^a$. Located between the two halves of the hub portion 22ᵇ of the driving pulley 22ᵃ, in position to surround the friction wheels 12ᵃ, is a hardened steel driving ring or circular track 18ᵃ, whose end faces are provided with circumferentially spaced lugs 20ᵃ adapted to cooperate with similarly spaced grooves formed in the adjacent inner faces of the two parts of said hub portion 22ᵇ. A space is provided between the periphery of the ring 18ᵃ and the opposing surface of the pulley; and the friction wheels 12ᵃ are in contact with the inner circumference of said ring and the driving shaft 5ᵃ that projects through one of the hub portions of the reduction wheel carrier 11ᵃ. The opposite hub portion of the carrier is closed by means of a plug 11ᵇ; and suitable packing rings 24ᵃ are provided between the hubs of the carrier and the pulley and between the pulley and the driving shaft, thereby preventing leakage of oil through the joints between these members.

With this arrangement, motion is transmitted from the drive shaft to the pulley at a reduced speed and in a reverse direction by means of the rolling friction between the contacting surfaces of the drive shaft, the planetary friction wheels and the circular track secured to said pulley.

The hardened steel ring or circular track is initially formed with a circular opening whose radius is slightly less than the distance from the axis of the shaft to the outer edges of the friction wheels. Thus, the ring must be expanded an amount sufficient to permit the same to embrace the planetary friction wheels. The rings are preferably expanded by heat and are then placed in position on the friction wheels and allowed to cool and thus contract or shrink thereon, thereby increasing the friction between the contacting surfaces of the friction gear and the power transmitted thereby. This arrangement increases the pressure of contact between the parts of the friction gear, whereby said gear is adapted for use in transmitting considerable power without slipping. During the travel of the planet wheels around the friction ring, the portions of the ring in contact with the wheels are forced outwardly. For this reason, a clearance is left between the outer circumference of the ring and the part opposite thereto and a sliding connection is formed between the ring and the part driven thereby.

Obviously, the construction above described admits of considerable modification without departure from my invention. For instance, the friction rings may be expanded in any manner and are adapted for use in connection with different kinds of friction gear.

What I claim is:

1. Friction gearing comprising a shaft, a ring surrounding said shaft, wheels located between said shaft and said ring and in contact therewith, a member having a portion opposite one end of said ring, and tongue and groove connections between opposing end faces of said ring and said member, said connections being adapted to permit relative radial movement of said ring and said member.

2. Friction gearing comprising a shaft, a plurality of wheels in contact with said shaft, a ring surrounding said wheels and in contact therewith, a rotary member concentric with said shaft, and a series of radially extending tongue and groove connections between the end face of said ring and the adjacent face of said rotary member, said connections permitting relative radial movement of said ring and said rotary member.

3. Friction gearing comprising a shaft, a ring surrounding said shaft, wheels between said shaft and said ring and in contact therewith, and a member surrounding said friction ring and having a sliding connection with one end thereof adapted to permit radial movement of the portions of said ring in contact with said wheels.

4. Friction gearing comprising a drive shaft, a fixed member concentric therewith, a series of radially spaced wheels journaled in said fixed member and in contact with said shaft, a pulley journaled on said fixed member, a ring embracing said wheels and driving connections between the end faces of said ring and said pulley, said connections permitting slight radial movement of said ring with relation to said pulley.

Signed at St. Louis, Missouri, this 28th day of April, 1922.

LIONEL A. CARTER.